United States Patent
Fong et al.

(10) Patent No.: US 12,296,684 B2
(45) Date of Patent: May 13, 2025

(54) HEAD-UP DISPLAY UNIT FOR VEHICLE INCLUDING FLOCKING AND METHODS FOR APPLYING FLOCKING ONTO SAME

(71) Applicant: Yazaki North America, Inc., Canton, MI (US)

(72) Inventors: Ching Fong, Ann Arbor, MI (US); Franky Tenka, Canton, MI (US)

(73) Assignee: YAZAKI NORTH AMERICA, INC., Canton, MI (US)

( * ) Notice: Subject to any disclaimer, the term of this patent is extended or adjusted under 35 U.S.C. 154(b) by 1158 days.

(21) Appl. No.: 17/028,712

(22) Filed: Sep. 22, 2020

(65) Prior Publication Data

US 2022/0089027 A1    Mar. 24, 2022

(51) Int. Cl.
*B60K 35/60*    (2024.01)
*B05D 1/14*    (2006.01)
(Continued)

(52) U.S. Cl.
CPC .............. *B60K 35/60* (2024.01); *B05D 1/14* (2013.01); *B60K 35/50* (2024.01); *B60R 11/0229* (2013.01); *G02B 27/0149* (2013.01); *B60K 35/23* (2024.01); *B60K 2360/688* (2024.01); *B60K 2360/816* (2024.01); *B60K 2360/92* (2024.01); *B60R 2011/0005* (2013.01); *B60R 2011/0047* (2013.01); *B60Y 2410/12* (2013.01); *G01D 11/28* (2013.01); *G02B 2027/0169* (2013.01)

(58) Field of Classification Search
CPC .............. B60K 35/50; B60K 2360/92; B60K 2360/816; B60K 2360/688; B60K 35/60; B05D 1/14; B60R 11/0229; B60R 2011/0005; B60R 2011/0047; G02B 2027/0169

See application file for complete search history.

(56) References Cited

U.S. PATENT DOCUMENTS 9,638,919 B1 * 5/2017 Wunderlich ....... G02B 27/0093
9,696,461 B2    7/2017 Nakamura
(Continued)

FOREIGN PATENT DOCUMENTS

WO    WO-2016117857 A1 *  7/2016 ............. G02B 27/01
WO    2018142471 A1    8/2018

*Primary Examiner* — Mohamed A. Wasel
(74) *Attorney, Agent, or Firm* — KENEALY VAIDYA LLP (57) ABSTRACT

Methods of flocking and various embodiments of head-up displays for a vehicle are contemplated. Some embodiments of a head-up display unit can include a display unit configured to display an image onto an observation surface of a vehicle and trim structure located about a periphery of the display unit. The trim structure can have an exterior surface configured to be exposed to an interior compartment of the vehicle. A substantially uniform and continuous adhesive layer can be located directly on and in contact with an entire extent of the exterior surface. Flocking can be applied by an air gun such that flocking is dispersed directly on and in contact with the adhesive layer and such that no backing layer exists between the flocking and the exterior surface. Some embodiments of the methods of flocking can include spraying an adhesive and spraying flocking onto trim for a head-up display device.

10 Claims, 8 Drawing Sheets

(51) Int. Cl.
  *B60K 35/50*   (2024.01)
  *B60R 11/02*   (2006.01)
  *G02B 27/01*   (2006.01)
  B60K 35/23    (2024.01)
  B60R 11/00    (2006.01)
  G01D 11/28    (2006.01)

(56) References Cited

U.S. PATENT DOCUMENTS

| | | |
|---|---|---|
| 9,939,638 B2 | 4/2018 | Yagi et al. |
| 10,525,666 B2* | 1/2020 | Hayasaki ............... G02B 5/26 |
| 2016/0025973 A1* | 1/2016 | Guttag ................ B60K 35/00 |
| | | 345/7 |
| 2016/0282620 A1* | 9/2016 | Park ..................... G02B 27/01 |
| 2017/0131548 A1* | 5/2017 | Wunderlich ....... G02B 27/0101 |
| 2019/0047418 A1* | 2/2019 | Yoshimura ........... H04N 9/3144 |
| 2019/0162965 A1* | 5/2019 | Han ................. G02B 27/0101 |
| 2019/0212553 A1* | 7/2019 | Kaneko ............... H05K 5/0017 |
| 2020/0225472 A1* | 7/2020 | Aoki ................. G02B 27/0149 |
| 2021/0003845 A1* | 1/2021 | O'Connell ......... G02B 27/0101 |

* cited by examiner

HEAD-UP DISPLAY UNIT FOR VEHICLE INCLUDING FLOCKING AND METHODS FOR APPLYING FLOCKING ONTO SAME

BACKGROUND

The disclosed subject matter relates to materials and coverings for interior surfaces of vehicles and, particularly, to internal structural surfaces of a Head-Up Display (HUD) apparatus. The disclosed subject matter also relates to methods and apparatus for improving viewing quality of the HUD, for example, by reducing an amount of light that reflects from various mounting or trim structures of the HUD to a viewing screen, such as a windshield. By reducing the reflected light from the mounting or trim structures of the HUD, the likelihood that an image of the mounting or trim structures can interfere with the image projected by the HUD to the vehicle windshield can be reduced.

Conventionally, structural surfaces surrounding the optical elements of a HUD apparatus have been painted black or covered in black/dark tape or black/dark velvet materials that require a backing layer for connection to the structural surfaces. The paints and/or materials are designed to absorb light in order to reduce a reflection image of the painted object or materials from appearing in the windshield. The process of painting and material application can be time intensive, costly, difficult to assemble/manufacture, and can result in less than adequate image reflection suppression. The backing layer of the tape and velvet materials is also not conducive to application to a compound curved surface without bunching, tearing, or separating.

SUMMARY

Some embodiments are directed to a method for applying flocking to an interior structure of a vehicle, such as support structures surrounding the optical elements of a HUD apparatus. The method can include applying an attractant to the interior structure, and deploying an amount of flocking from a flocking disbursement device to the attractant such that the flocking adheres to the interior structure.

In accordance with another aspect of the disclosed subject matter, the interior structure can be a head-up display device that includes a display device and a curved trim surface located adjacent the display device, and applying an attractant can include applying adhesive or electric charge or magnetic charge to the trim surface, and deploying the flocking can include deploying the flocking to the trim surface.

In accordance with another aspect of the disclosed subject matter, deploying an amount of flocking from a flocking disbursement device includes entraining the flocking into a flow of air, and directing the flow of air towards the interior structure. Some embodiments can include providing an air gun that includes a storage compartment for flocking, a motor configured to generate air flow, and a conduit configured to direct air flow generated by the motor such that flocking from the storage compartment is entrained in the air flow and passes through the conduit and out of the air gun; and providing an attractant application structure, wherein deploying flocking includes using the air gun to deploy the flocking, and applying an attractant includes using the attractant application structure to apply the attractant to the interior structure.

In accordance with another aspect of the disclosed subject matter, a head-up display unit for a vehicle can include a display unit configured to display an image onto an observation surface of a vehicle, trim structure located adjacent the display unit and configured to provide a continuous surface transition from the head-up display unit to a dashboard surface of the vehicle. The trim structure can have a three-dimensional curved exterior surface configured to be exposed to an interior compartment of the vehicle when assembled therewith. A continuous and singular attractant can be located on an entire extent of the exterior surface of the trim structure. Flocking can be in contact with the attractant and substantially cover the exterior surface of the trim structure. The attractant can be a spray-on adhesive layer, or an electric charge, or a magnetic charge on the trim structure. Further, the flocking can include a plurality of fibers dispersed on the attractant, and the flocking can be directly in contact with the attractant, and the attractant can be directly in contact with the trim structure, such that a unitary-single attractant layer exists between the flocking and the trim structure and such that no backing layer is present between the flocking and the trim structure.

In accordance with another aspect of the disclosed subject matter, a head-up display unit for a vehicle can include a display unit configured to display an image onto an observation surface of a vehicle, and trim structure located about a periphery of the display unit. The trim structure can have an exterior surface configured to be exposed to an interior compartment of the vehicle when assembled therewith. A substantially uniform and continuous adhesive layer can be located directly on and in contact with an entire extent of the exterior surface. Flocking can be dispersed directly on and in contact with the adhesive layer such that no backing layer exists between the flocking and the exterior surface.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Figure 1:
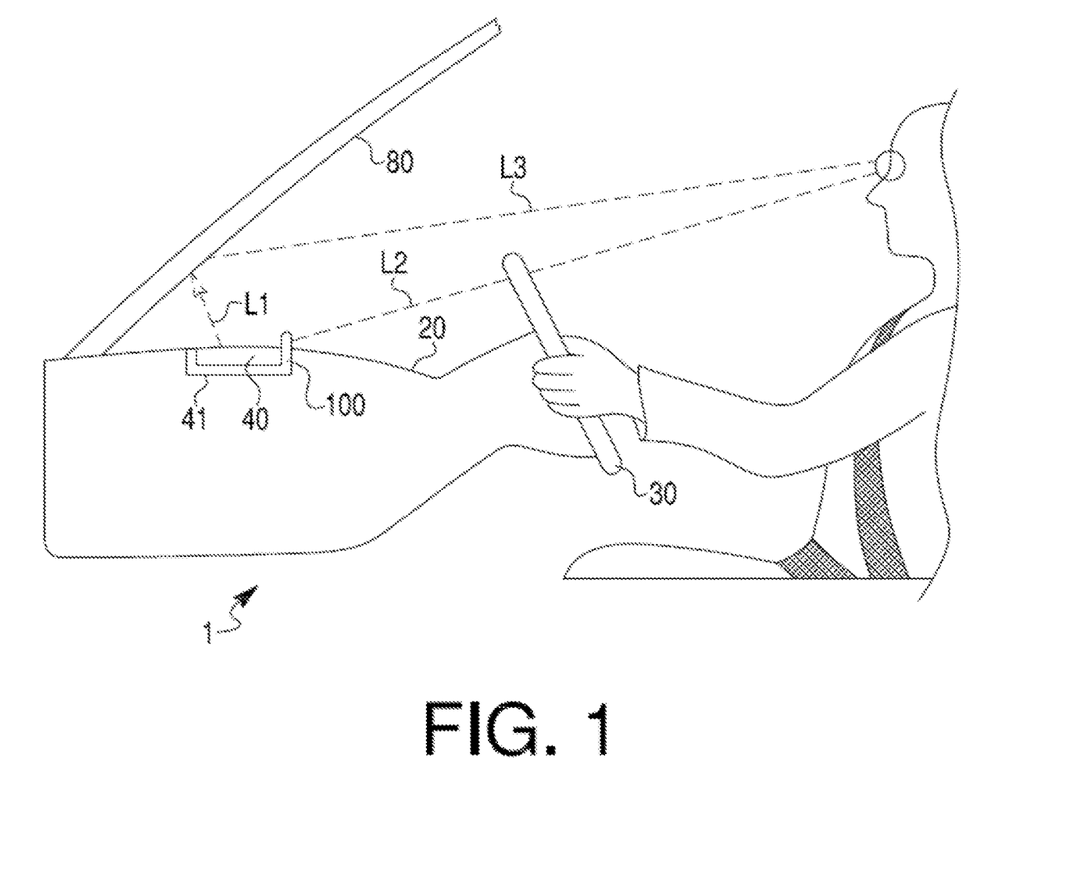
FIG. 1 is a schematic view of an embodiment of a vehicle interior made in accordance with principles of the disclosed subject matter.

FIG. 1 depicts an embodiment of a vehicle 1 made in accordance with principles of the disclosed subject matter. The vehicle 1 can include a windshield 80 and a dashboard 20 located adjacent and below the windshield 80. A head-up display (HUD) apparatus 40 can be located on or in the dashboard 20 of the vehicle 1, and can include HUD trim structure 41 that allows the HUD apparatus 40 to form a continuous surface with the dashboard 20. During operation, the HUD apparatus projects an image to an observation surface (e.g., windshield 80) along sight line L1, which is then reflected towards an operator's eyes along sight line L3, such that information regarding the vehicle operation can be communicated to the operator. For example, vehicle speed, posted speed, engine status, lane change status, emergency alerts, and other information can be projected onto the observation surface (e.g., windshield 80) for easy head-up viewing by the operator. A portion of the light from the HUD apparatus 40 directed along sight line L1 will also travel through and be redirected by the windshield 80. Thus, the image projected by the HUD apparatus will appear to a viewer/driver as being located in front of the windshield 80 and at a location above the hood of the vehicle or in front of the vehicle, as desired per the design or specific vehicle application requirements.

As will be described in more detail below, the HUD trim structure 41 can be include a flocking or flocked surface 100 in order to absorb light incident thereon. The HUD trim structure 41 can include various structures not considered to be an optical component of the HUD apparatus 40. Structures that are not considered to be an optical component of the HUD apparatus 40 include trim structures, brace structures, molding structures, escutcheon, attachment structures, ribs, dashboard surfaces, housing, etc. By contrast, structures that are considered to be an optical component of the HUD apparatus 40 can include any structure intended to act on or produce a light image in the HUD apparatus, such as a mirror, light emitting element, lens, etc. The combination or a sub-combination of the optical elements of the HUD apparatus 40 can also be referred to as a display device.

Figure 2A:
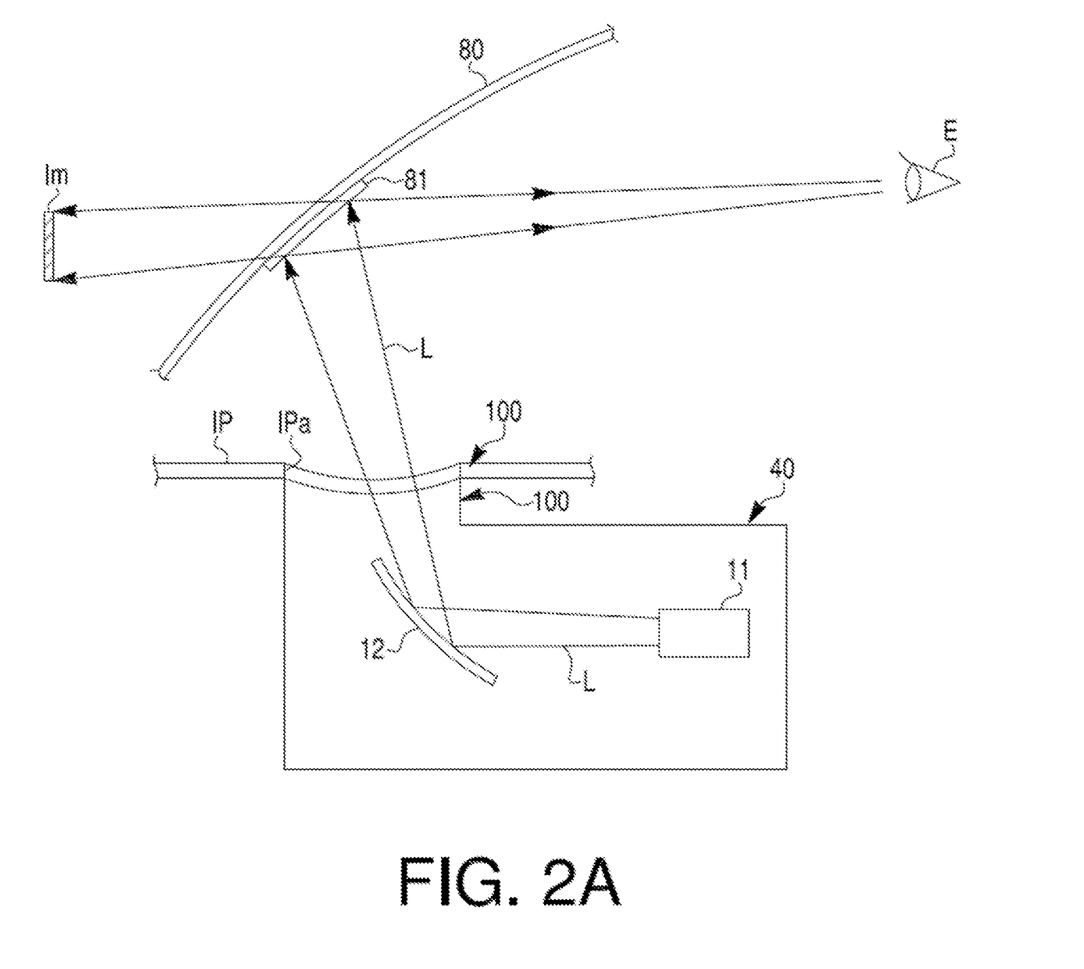
FIGS. 2A and 2B are schematic views of two different embodiments of a vehicle HUD apparatus made in accordance with principles of the disclosed subject matter.

FIG. 2A depicts a HUD apparatus 40 for a vehicle that is configured to project a display of various kinds of information as an image from the HUD apparatus 40 onto a reflection sheet such as a front windshield 80, or a combiner sheet, or a holographic optical element (HOE), etc. In this embodiment, a screen 81 is located at the reflection position on the windshield 80 for the light emitted by the HUD apparatus 40. The screen 81, for example, can include a plurality of optical devices, such as lenses, or HOE, that may be used to correct for any distortion of the image that the shape or placement position of the windshield 80 causes on the image projected by the HUD apparatus 40. The image is projected using a light imaging source 11 that projects an image along sight line L onto a mirror 12 that can include one or more mirrors flat or non-flat in shape, and which then projects that same image forward through opening IPa in the instrument panel IP and upward onto the windshield 80 of the vehicle. A portion of the light image is reflected form the optical path in such a manner that the light reflected on the front windshield heads toward the viewpoint E of a driver. The driver can thus visually recognize the image included in the light emitted from the HUD apparatus as a virtual image in front of the windshield. Thus, various kinds of information emitted from the HUD apparatus 40 can be viewed as a virtual image above the front of the vehicle such that the driver can observe typical real time driving conditions without moving the driver's typical driving sightline during operation.

Figure 2B:
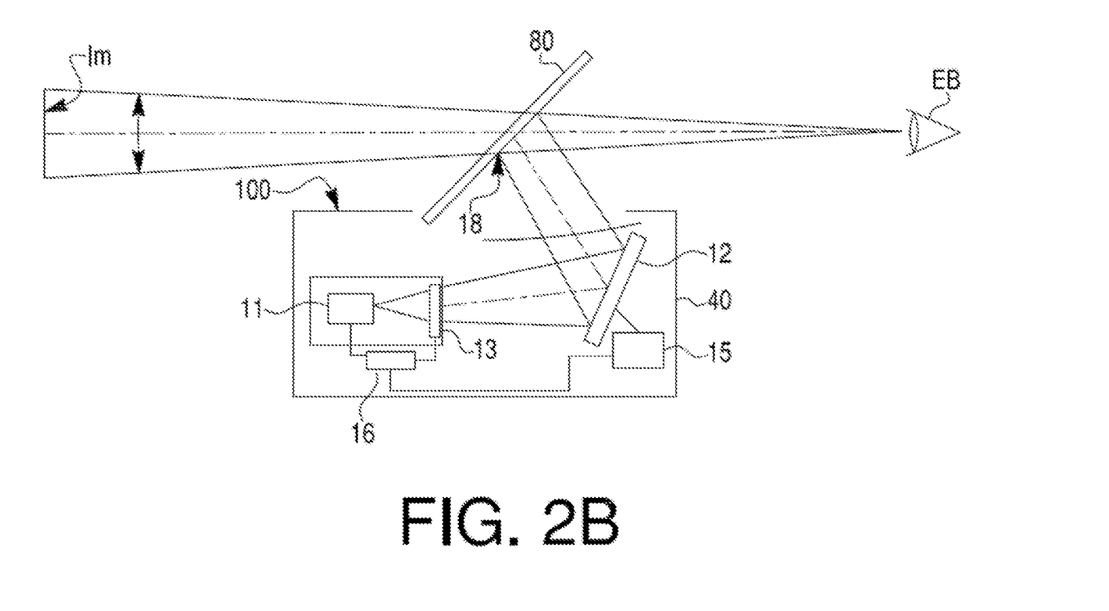

FIG. 2B depicts another embodiment of a HUD apparatus 40 for a vehicle that is configured to project a display of information as an image from the HUD apparatus 40 onto the front windshield 80 of a vehicle, such that the image appears to the driver as a virtual image in front of the windshield 80. The image is originally projected using a light imaging source 11 that, in this embodiment, projects light to a liquid crystal display (LCD) panel 13 that then forms an image that is projected onto a mirror 12 which then projects that same image in a reverse direction (with respect to a longitudinal axis of the vehicle) and through an opening in the dashboard 41 upward onto the windshield 80 of the vehicle. Thus, in this embodiment, the light imaging source 11 originally projects in a direction toward a rear of the vehicle, while the previous embodiment described with respect to FIG. 2A has a light imaging source 11 that projects in a direction toward a front of the vehicle. A portion of the light image produced by the backlit LCD panel 13 of FIG. 2B is partially reflected at an irradiation area 18 of the windshield 80 toward the viewpoint E of a driver. The driver can thus visually recognize the image as a virtual image in front of the windshield 80. Thus, various kinds of information emitted from the HUD apparatus 40 can be viewed as a virtual image above the front of the vehicle such that the driver can observe typical real time driving conditions without moving the driver's typical driving sightline during operation.

Figure 3:
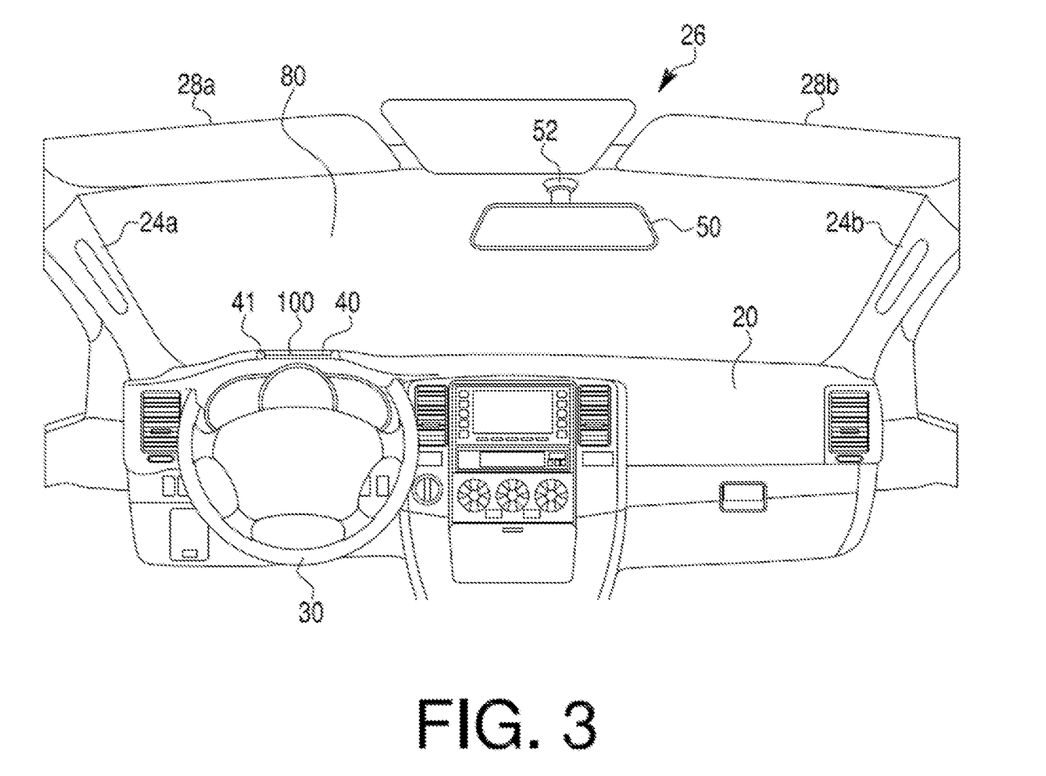
FIG. 3 is another schematic interior view of the vehicle interior of FIG. 1.

FIG. 3 is another schematic interior view of the vehicle 1 of FIG. 1. Two A-pillars 24a and 24b are shown that, along with roof 26 and dashboard 20, frame the windshield 80. The HUD apparatus 40 can be located on or in the dashboard 20 and configured to project images onto the windshield 80. HUD trim structure 41 located about a periphery of optical components of the HUD apparatus 40 allows the HUD apparatus to blend into or form a continuous surface with the dashboard 20. The trim structure 41 can be a compound curved surface that is coated with flocking 100 in order to reduce reflection of the HUD trim structure 41 onto the observation surface, such as the windshield 80.

Figure 4A:
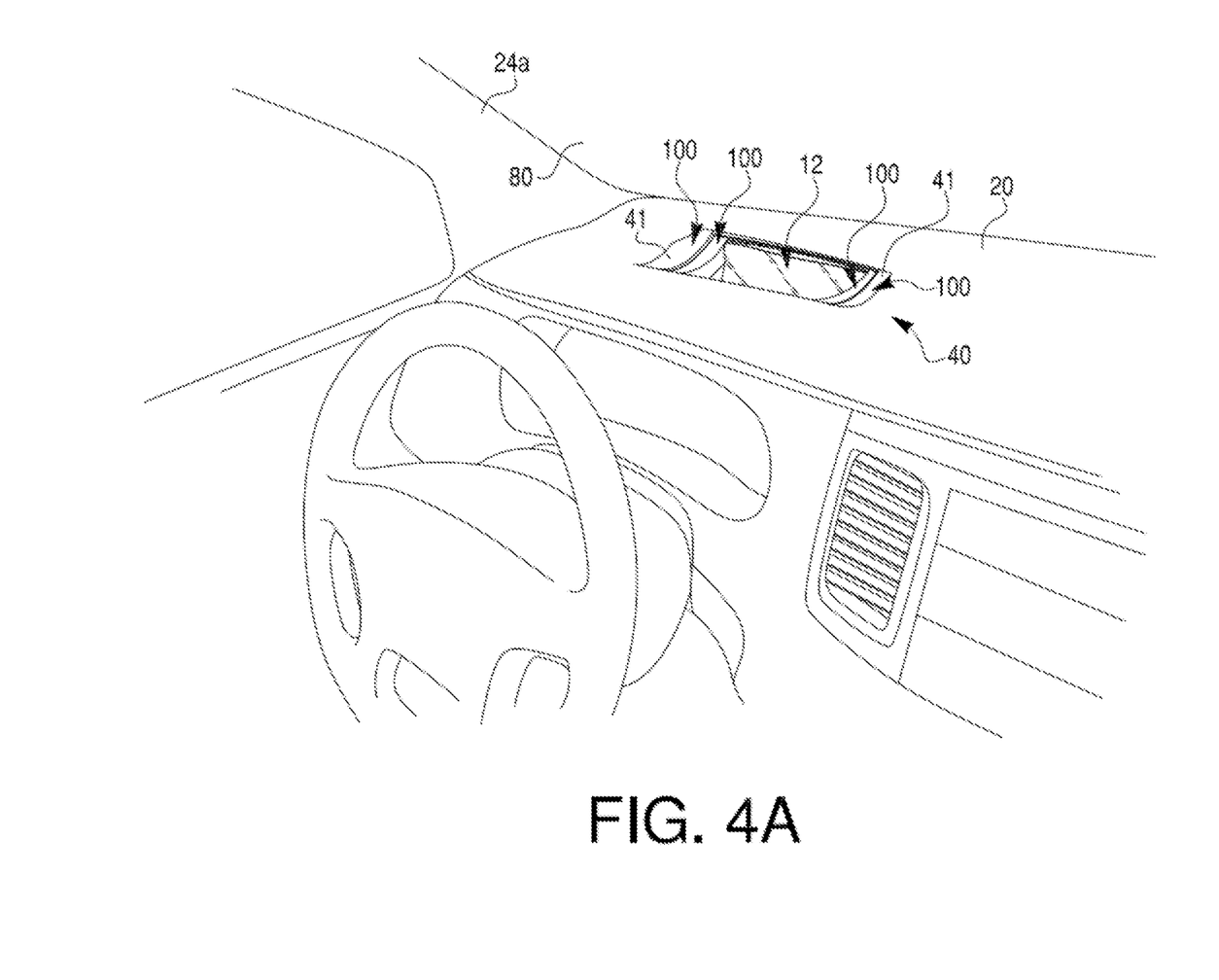
FIGS. 4A and 4B are a schematic interior view of another embodiment of a vehicle interior with HUD apparatus, and a cross-section of the HUD apparatus, made in accordance with principles of the disclosed subject matter.
Figure 4B:
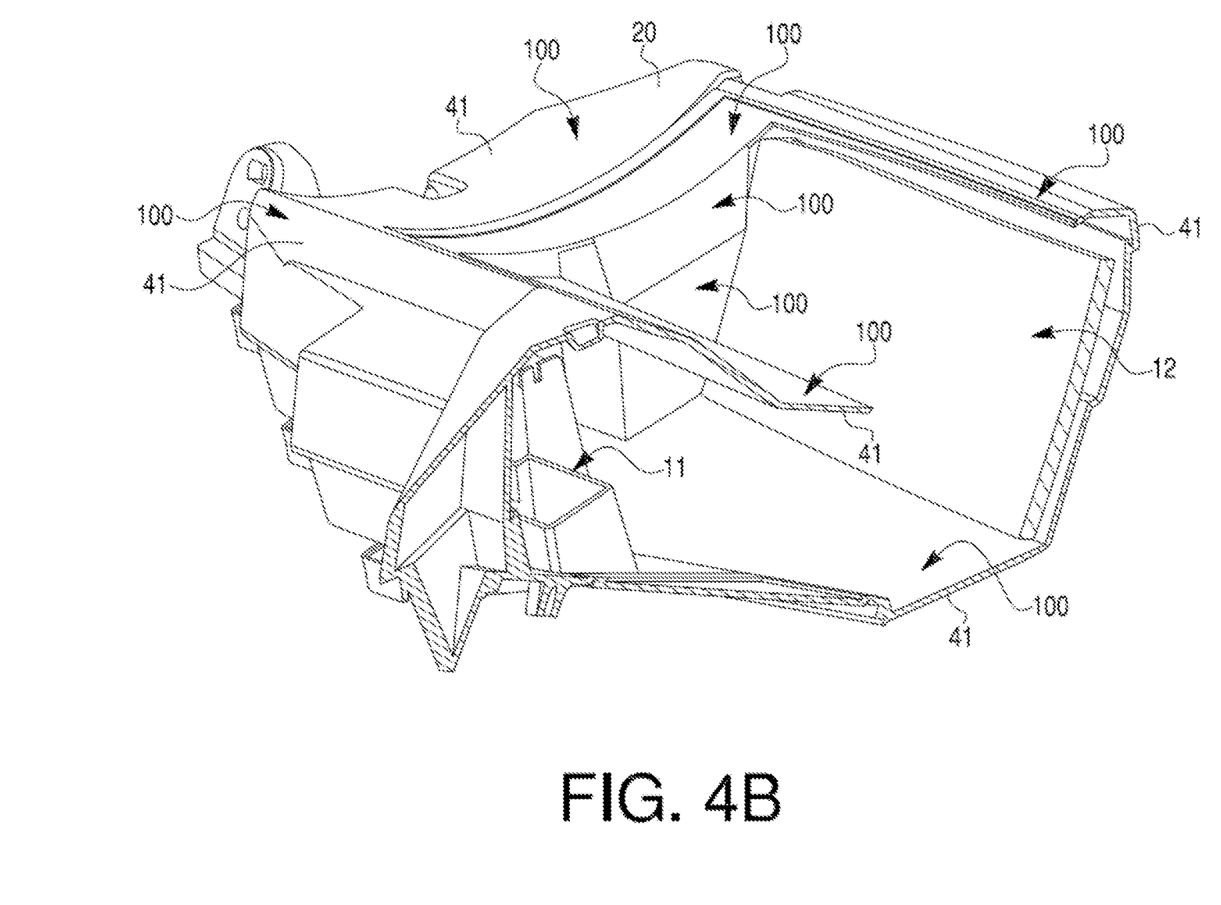

FIG. 4A is a schematic interior view of another embodiment of a vehicle interior with HUD apparatus 40, while FIG. 4B is a cross-section of the HUD apparatus 40 of FIG. 4A. In particular, FIG. 4A shows the HUD apparatus 40 recessed into a dashboard 20 with various HUD trim structures 41 covered with flocking 100. FIG. 4B shows a close-up perspective cross-sectional view of the HUD apparatus 40 of FIG. 4A including compound 3-dimensional curved surfaces for the HUD trim structure 41 that allow the HUD apparatus 40 to have a finished look and blend smoothly into a surface of the dashboard 20. Of course, appearance isn't the sole purpose for the flocking. Maximum light absorption is one of the main purposes for using flocking to ensure glare and mirrored or ghost images are prevented from being apparent in the windshield of a vehicle with the HUD apparatus 40. The reason why flocking is a more effective light absorber than black paint is because with black paint, light reflects off it, and bounces off. Thus, there is only one chance for the light to be absorbed by the black paint. Even though the paint absorption may be very high, say 95% light absorption, there still is only one opportunity. With flocking, however, light is bounced back and forth between the black fibers, going deeper and deeper from the top of the fiber toward the bottom. With each bounce, over 90% of the light gets absorbed. After two bounces, only 1% of the light may remain. Painted surfaces absorb light utilizing the property of the paint. By contrast, a flocked surface uses the property of the fiber (being black)

and the structure (a forest of fibers forming numerous light "traps") to absorb light. Similar structures can be found in a sound lab. For example, use of a foam cone on a wall works in a similar way as the fibers of a flocked surface, but for the purpose of absorbing sound.

The light imaging source 11 (schematically represented in the drawings) can be located inside of the HUD trim structures 41 and can emit a light image toward mirror 12 for projection to a windshield 80. Flocking 100 can uniformly coat the exterior surface of the HUD trim structures 41 that face towards the interior of the vehicle 1. The flocking 100 is evenly distributed on the entire exterior surface of the HUD trim structure 41 without break or interruption, and such that the pieces of flock per unit area is constant across the entire surface that is coated with the flocking 100 (e.g., across the entire exterior surface of the HUD trim structure 41 that faces towards the interior of the vehicle 1).

Figure 5A:
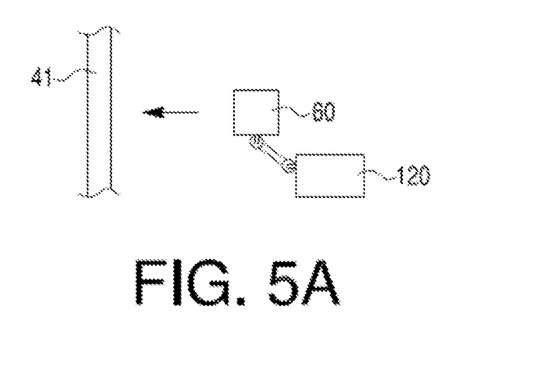
FIGS. 5A-D illustrate an exemplary flocking application method using an air gun to apply flocking material in accordance with principles of the disclosed subject matter.
Figure 5B:
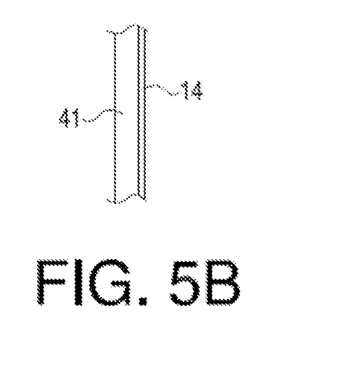

FIGS. 5A-D illustrate an exemplary flocking application method using an air gun to apply flocking material in accordance with principles of the disclosed subject matter. FIG. 5A shows an attractant applicator 60 (e.g., an adhesive spray gun, magnetic or electric charging device, etc.) in the process of applying an attractant 14 (e.g., an adhesive, electrical charge, magnetic charge, etc.) to the HUD trim structure 41. The HUD trim structure 41 can include compound curved surfaces, and the attractant can be applied to uniformly cover an entire exterior surface of the HUD trim structure 41 (e.g., a compound curved surface of the HUD trim structure 41 that is intended to be exposed to an interior of the vehicle 1). FIG. 5B shows a unitary continuous layer of attractant 14 directly contacting the HUD trim structure 41. Because the attractant is deposited or sprayed onto the HUD trim structure 41, there are no breaks in the attractant 14 layer as might occur with tape or sheets of fabric applied to the HUD trim structure 41.

It should be emphasized that a main purpose of the flocking is to provide maximum "blackness" or light absorption for the interior structure of the HUD apparatus 40. The interior structure can be any structural surface located inside of the HUD apparatus 40, or any structure that could be reflected on the windshield of a vehicle in which the HUD apparatus 40 is installed. In a vehicle environment, sunlight enters a windshield at such an angle that the interior structure of the HUD apparatus may be lit up. Even when the interior is painted with black paint, 5% of the sunlight reflection (which is common for black paint) is still very bright. As a consequence this lit up area may become visible from the driver seat. The image of the lit area may be reflected by the windshield and appears like a ghost image to the driver. To minimize this ghost image, the interior structure of the HUD should have maximum "blackness." The higher the interior surface light absorption, the dimmer the ghost image becomes to the operator of the vehicle.

Figure 5C:
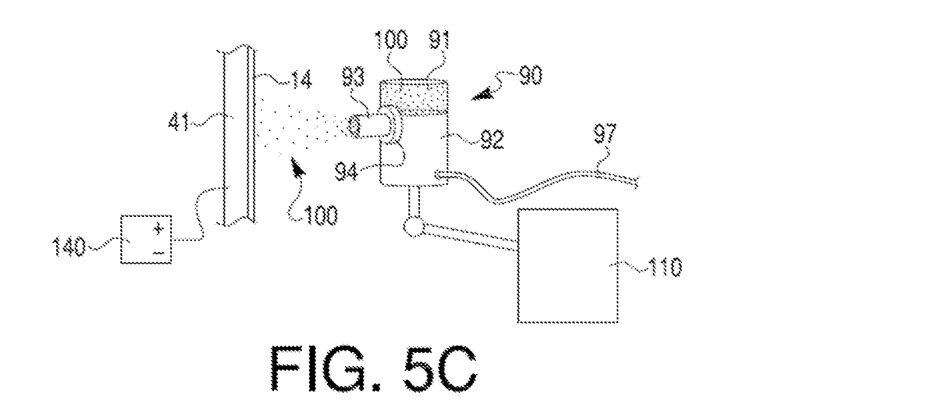

FIG. 5C shows a flocking gun 90 (e.g., an air blowing gun, a magnetic disbursement gun, electrostatic gun, etc.) configured to disperse flocking 100 towards the HUD trim structure 41. The trim structure 41 can be a plastic or metal material that is electrically or magnetically charged by a charge applicator 140 (e.g., an electrostatic charging device, an electricity source, a magnetic charging device, etc.). The flocking 100 disbursed by the flocking gun 90 can be a fabric flocking, such as cotton, nylon, polyester, wool, plastic, natural fibers (e.g., hair, fur), etc., or can be other types of flocking including electrostatically charged flocking, flocking with magnetic material (e.g., metal) disbursed therein, ceramics, foams, etc. When referencing the pieces of flocking 100, the pieces are considered to be each individual fiber or particle of metal or foam that is used to coat the surface of the HUD trim structure 41. The use of extra black fiber flocking to treat interior surfaces can improve light absorption and eliminate unintended reflection of light within the vehicle 1. The use of extra black fiber flocking can further improve the light absorption of the flocking material and reduce the amount of reflection of the flocked surface on various interior viewing surfaces such as the windshield 80. The flocking 100 can be stored or located in a container 91 located adjacent a motor 92 and conduit 93 of the flocking gun 90. If desired, an electrostatic charge applicator 94 can be provided on the flocking gun 90. During use, the motor 92 creates an air flow through the conduit 93, which in turn draws flocking 100 into the conduit and entrains the flocking 100 in the air flow within the conduit 93. Thus, the flocking 100 can be directed out of a nozzle at an end of conduit 93 towards the HUD trim structure 41 (or other interior structure of the vehicle 1). The flocking 100 will adhere to the attractant 14 upon contact. For example, if the attractant is an adhesive, the flocking 100 will embed into the adhesive layer and, upon curing of the adhesive (if the adhesive is a curable adhesive), become permanently attached to the HUD trim structure 41. If desired, the flocking 100, the attractant 14, and/or HUD trim structure 41 can be either magnetically or electrically charged. Thus, the flocking 100 will be more likely to attach only to the HUD trim structure 41 and not to other structures such as the windshield 80 or optical elements of the HUD apparatus 40.

Figure 5D:
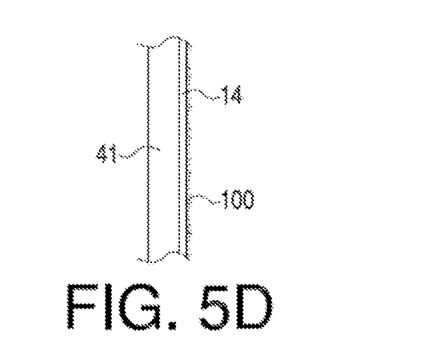

FIG. 5D shows the flocking 100 adhered to the attractant 14 on the HUD trim 41. It should be noted that no backing layer exists between the flocking 100 and the HUD trim structure 41 because no tape or woven fabric was necessary to be used in this method. Thus, the finished product will consist or consist essentially of the HUD trim structure 41, the attractant 14 layer, and the flocking 100 layer which are each in direct contact with each other. In some cases, a primer may be used with the attractant 14 when the attractant is in the form of an adhesive that requires a primer. It is also contemplated that a plasma treatment, corona or ionization treatment, and/or chemical wetting or other process be used to treat the HUD trim structure 41 and/or flocking 100 before they are adhered together via attractant 14 (such as adhesive, or other connective material, substance, or structure). There is typically no need for a primer during the flocking process. However, corona treatment may be utilized to improve the adhesive characteristics for the application of the flocking 100. Although primer is not needed, in another embodiment the surface can be activated before spraying with adhesive using a flaming process (quickly running a flame over a target surface). Corona treatment is slightly different from this flame processing, but may also work.

Also, while the flocking gun 90 can be manipulated by hand to carry out the disclosed process, a flocking robot 110 can be used to manipulate the flocking gun 90 over the HUD trim structure 41 to carry out the flocking process steps as well. Similarly, an attractant robot 120 can be used to carry out application of the attractant 14 to the HUD trim structure 41 (or other interior surface of vehicle 1). Both the attractant 14 layer and flocking 100 layer will be substantially continuous and without interruption over the entire exterior surface of the HUD trim structure 41 that is intended to be exposed to the interior of vehicle 1 and that is located adjacent to optical elements of the HUD apparatus 40 (i.e., over the entire surface of the trim structure 41 located between the optical elements and the dashboard 20 in the interior of vehicle 1). The pieces of flocking 100 per unit area of this entire surface can be constant, such that the flocking 100 is disbursed in a unitary, uninterrupted, uniform fashion. Likewise, the adhesive can form a single uniform layer of substantially equal thickness across an entirety of the exterior surface of the HUD trim structure 41 that is intended to be exposed to the interior of vehicle 1 and that is located adjacent to the optical elements of the HUD apparatus (i.e., over the entire surface of the trim structure 41 located between the optical elements and the dashboard 20 facing the interior of vehicle 1).

The flocked surface provides light absorption qualities and prevents light reflection from complex curved surfaces, such as the HUD trim structure 41 as well as other interior structures noted above, onto an observation surface for the HUD apparatus 40.

Once a substantially uniform surface coated with flocking 100 is achieved, a final step of blowing air onto the HUD trim structure 41 to remove unwanted or loose flocking 100 can be undertaken. In addition, air can be blown onto the HUD apparatus 40 in its entirety (as well as other interior surfaces of the vehicle) to ensure that no unwanted flocking 100 is present that might obstruct optical pathways for the HUD apparatus 40 or causes quality control issues for the vehicle 1.

Figure 6:
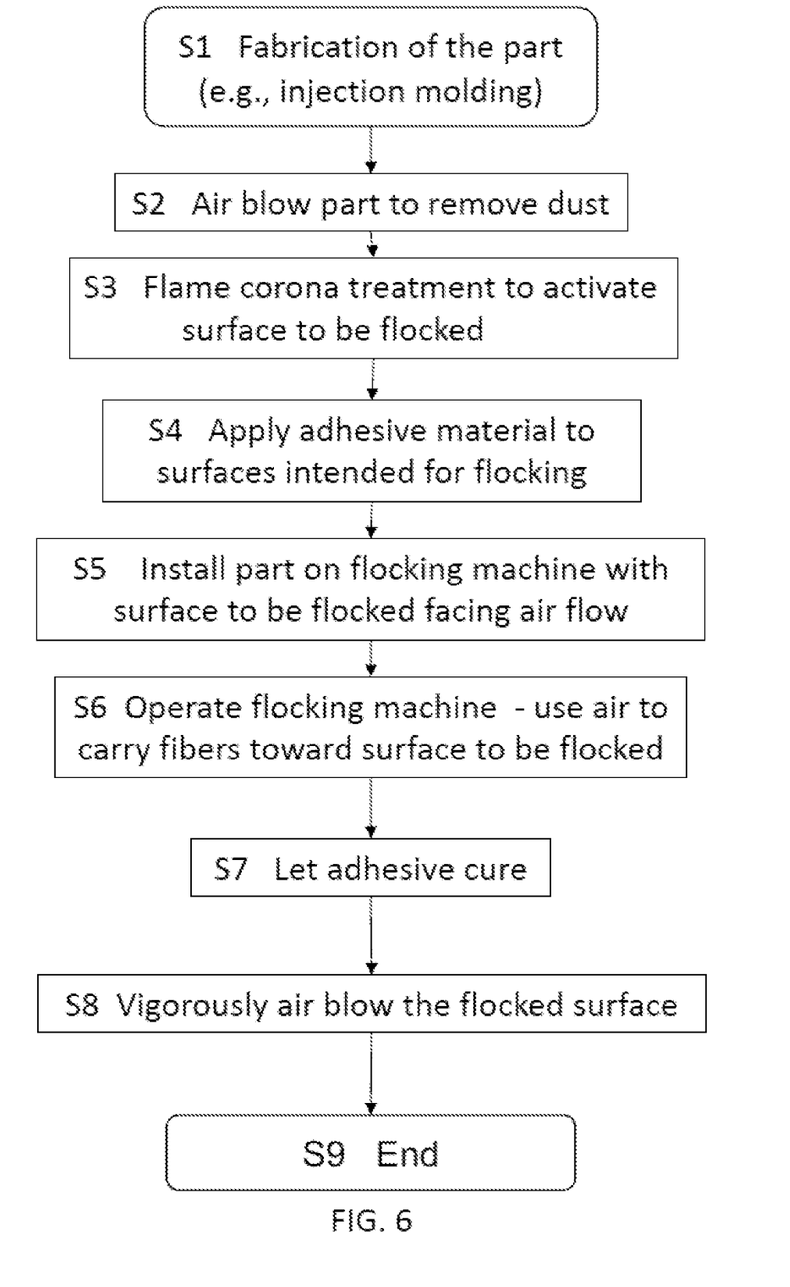
FIG. 6 is a flow chart that depicts an embodiment of a method in accordance with the disclosed subject matter.

FIG. 6 is a flow chart that depicts an embodiment of a method in accordance with principles of the disclosed subject matter. In step S1 the fabrication of the part is undertaken. Fabrication can be achieved by various methods, including but not limited to injection molding. In step S2, air is blown onto the part surfaces that are to be flocked to remove dust and debris. In step S3 a flame corona treatment can be conducted on the parts to be flocked to activate the surfaces to be flocked. In step S4, adhesive material can be applied to the surfaces intended for flocking. Application of the adhesive can include, but is not limited to, spraying the adhesive onto the surfaces to be flocked. In step S5, the part of the HUD apparatus that is to be flocked can be installed on a flocking machine with the surface that is intended to be flocked facing a direction of air flow. In step S6, power is provided to the flocking machine which can use air to carry fibers toward the surface that is intended to be flocked. In step S7, the adhesive is allowed to cure. In step S8, air can be vigorously blown towards the flocked surface to remove any unattached or loose fibers. Air can also be blown onto any optical apparatus or elements (such as lenses, or any transparent or glass elements) to remove loose fibers from these elements to avoid image deterioration that may be caused from fibers and debris located on optical elements or apparatus. Although the flow chart is described in a series of steps S1-S8, each of these steps is not necessary for the disclosed method, and the order or sequencing of the steps can be rearranged in a different sequential order. Similarly, additional steps can be added to the method and remain within the scope of the disclosed subject matter.

While certain embodiments of the invention are described above, it should be understood that the invention can be embodied and configured in many different ways without departing from the spirit and scope of the invention.

For example, flocking could include the use of fibers in colors other than black, depending on the needs and desires of the automobile manufacturer or the consumer. The flocking application also can be modified. Instead of an air gun, fibers can be applied by other means and methods, including the use of electro-magnetic devices or manual devices, such as application rollers or brushes, etc.

Flocking can also be applied to surfaces within a vehicle 1 other than those mentioned herein. Other interior surfaces can include door panels, seats, consoles, gear shift, steering wheel column, etc. Flocking can also be applied in accordance with the method disclosed above to the increasing number of vehicle communications devices, including trim surrounding video screens, display panels, or trim surrounding any window or glass structure in the vehicle.

The trim structure 41 can allow the optical elements of the HUD apparatus 40 to be indented or sunk into the dashboard 20, or to be level with the dashboard 20, or can even allow the optical elements of the HUD apparatus 40 to be located above a planar surface that contains the dashboard 20. Thus, the compound curved surface of the trim structure 41 can be located at, below or above a plane that contains that dashboard 20.

The HUD apparatus 40 is shown in front of a driver's position in a vehicle. However, it is possible to install the HUD apparatus 40 at other locations anywhere in the vehicle 1, such as in a central console, or even in door panels or rear window trim for projecting an image to side windows or the rear window, or other observation surface within the vehicle 1. Other structures in a vehicle that can reflect light towards an observation surface (e.g., windshield 80, side windows, rear window, separate observation glass, etc.) include visors 28a and 28b, steering wheel 30, rear view mirror 50 and rear view mirror bracket 52, A-pillars, B-pillars, etc. These structures can all reflect light coming through the windshield 80, rear windshield, and side windows onto an observation surface. Reflections from these structures can compromise the ability of the driver and passengers to see images projected from the HUD apparatus 40 onto the observation surface. In order to reduce this reflection, black flocking can be applied to each of these structures in accordance with the method disclosed herein to eliminate unintended reflection of light from the structure(s) to the observation surface and ultimately to the viewer.

While we have described methods for flocking the interior trim portions of a HUD for a passenger automobile type vehicle, flocking can also be applied to HUD apparatus s for other vehicles, including pickup trucks, SUVS, vans, tractor trailers, motorcycles, aircraft, trains, boats, and even spacecraft.

While the subject matter has been described in detail with reference to exemplary embodiments thereof, it will be apparent to one skilled in the art that various changes can be made, and equivalents employed, without departing from the scope of the invention.

What is claimed is:

1. A head-up display unit for a vehicle, comprising:
   a display device configured to display an image onto an observation surface of a vehicle;
   trim structure located adjacent the display device and configured to provide a continuous surface transition from the head-up display unit to a dashboard surface of the vehicle, the trim structure having a three-dimensional curved exterior surface configured to be exposed to an interior compartment of the vehicle when assembled therewith;
   a continuous and singular attractant layer located on an entire extent of the exterior surface of the trim structure; and
   flocking in contact with the attractant layer and uniformly covering the exterior surface of the trim structure.

2. The head-up display unit for a vehicle of claim 1, wherein the attractant is a spray-on adhesive layer.

3. The head-up display unit for a vehicle of claim 1, wherein the attractant is at least one of an electric charge and magnetic charge on the trim structure.

4. The head-up display unit for a vehicle of claim 1, wherein the flocking includes a plurality of fibers dispersed on the attractant, and the flocking is directly in contact with the attractant, and the attractant is directly in contact with the trim structure, such that a unitary-single attractant layer exists between the flocking and the trim structure and such that no backing layer is present between the flocking and the trim structure.

5. The head-up display unit for a vehicle according to claim 1, wherein the flocking includes a plurality of fibers.

6. The head-up display unit for a vehicle according to claim 1, wherein the flocking is a fabric flocking.

7. The head-up display unit for a vehicle according to claim 6, wherein the fabric flocking is one of cotton fabric, nylon fabric, polyester fabric, wool fabric and natural fiber fabric.

8. The head-up display unit for a vehicle according to claim 1, wherein the flocking includes a magnetic material.

9. A head-up display unit for a vehicle, comprising:
a display device configured to display an image onto an observation surface of a vehicle;
trim structure located about a periphery of the display device, the trim structure having an exterior surface configured to be exposed to an interior compartment of the vehicle when assembled therewith;
a substantially uniform and continuous adhesive layer located directly on and in contact with an entire extent of the exterior surface; and
flocking dispersed directly on and in contact with the adhesive layer such that no backing layer exists between the flocking and the exterior surface.

10. A head-up display unit for a vehicle, comprising:
a display device configured to display an image onto an observation surface of a vehicle;
trim structure located adjacent the display device and configured to provide a continuous surface transition from the head-up display unit to a dashboard surface of the vehicle, the trim structure having a three-dimensional curved exterior surface configured to be exposed to an interior compartment of the vehicle when assembled therewith; and
flocking uniformly covering at least a portion of the exterior surface of the trim structure.

\* \* \* \* \*